United States Patent [19]

Hoskins et al.

[11] Patent Number: 5,012,570

[45] Date of Patent: May 7, 1991

[54] METHOD FOR ROBOT ASSEMBLY OF COMPUTER HARD DISC ONTO A SPINDLE

[75] Inventors: Robert G. Hoskins, Batavia; Steve P. Johns, Rochester, both of N.Y.

[73] Assignee: Ambac Automation Corp., Carrollton, Tex.

[21] Appl. No.: 346,052

[22] Filed: May 1, 1989

[51] Int. Cl.⁵ .............................................. B23Q 3/155
[52] U.S. Cl. ........................................ 29/467; 29/418; 29/525; 29/602.1
[58] Field of Search ...................... 29/592.1, 429, 445, 29/464, 467, 737, 760, 525, 602.1, 604, 418; 414/222, 225; 360/99.02, 99.05; 369/270, 271; 901/34, 50

[56] References Cited

U.S. PATENT DOCUMENTS 4,862,584  9/1989  Budy et al. ..................... 29/737 X Primary Examiner—Joseph M. Gorski
Assistant Examiner—Peter Dungba Vo
Attorney, Agent, or Firm—John R. Beneflel

[57] ABSTRACT

A method of assembling computer hard discs (12) onto a spindle (14) with a robot device (22) with only negligible contact forces to avoid generation of contaminating microparticles by scraping contact, in which a spindle supporting table (24) rests on gas film bearing pads (46) allowing frictionless lateral movement. The table (24) is initially positively positioned by locating devices (56) to fix the location of the spindle (14) in horizontal plane, and a disc (12) moved onto a tapering homing fixture (15) previously positioned over the spindle (14). The table (24) is released for frictionless lateral movements as the disc (12) is advanced onto the spindle (14).

3 Claims, 2 Drawing Sheets

METHOD FOR ROBOT ASSEMBLY OF COMPUTER HARD DISC ONTO A SPINDLE

This invention concerns automation assembly apparatus and methods and more particularly robot arm assembly of computer hard discs onto a spindle mounted in a disc housing. It is critical that scraping between the disc and spindle be avoided during assembly, since minute particles are generated by even slight scraping, which particle contaminate the disc surfaces.

Such discs have heretofor been assembled onto the rather close fitting spindles manually, but this is a time consuming task, particularly when great care is being taken to avoid scraping contact. Even with such care, scraping contact would inevitably occur occasionally, causing inacceptable contamination of the disc surfaces.

Automated assembly by the use of robot arm devices is made difficult by this need to avoid scraping contact, since highly sensitive force sensors must be employed to detect and nullify contact as the robot arm advances the disc onto the spindle. Further difficulties are encountered if the spindle and disc are closely fit in that the typical robot arm devices will usually overshoot when attempting to eliminate a scraping condition, creating heavy contact of the disc on the opposite side of the spindle. In any event, assembly by a robot arm would be slow due to the need for executing one or more corrections of the robot arm position as the disc is advanced onto the spindle.

Also, such apparatus would require force sensors and highly sophisticated and costly controls for the robot arm.

SUMMARY OF THE INVENTION

The present invention comprises an apparatus and method of assembling computer hard discs or the like onto a closely fit spindle diameter with the use of a robat arm, involving only negligible contact forces not resulting in disc contamination, and which is carried out rapidly and without necessitating the use of force sensors or sophisticated controls.

According to this concept, the spindle is carried by a gas film bearing supported table which allows nearly friction free lateral movement to be induced by contact of the disc with the spindle as it advances by movement of the robot arm device.

A locating device initially positively locks the table, preventing such lateral movement, and fixedly locates the spindle in the horizontal plane. A homing fixture is installed atop the spindle comprised of a tapered plug having an upper diameter substantially smaller than the spindle, increasing to the full maximum diameter of the spindle.

The robot arm carries the disc above the homing fixture and lowers the same over the upper, smaller diameter end, which movement is ensured to be without contact between the homing fixture and disc since the difference in diameters of the disc opening and fixture are such that failsafe location is able to be achieved within the positional tolerance able to be achieved by the robot arm, with a given disc opening size and locational accuracy of the locating device. The locating device is then operated to release the table to allow friction free, limited horizontal movement and the robot arm advances the disc onto the spindle.

Contact between the disc and spindle causes shifting of the spindle to be aligned with the disc opening, but this contact does not produce signification scraping away of contaminating particles, since the friction free gas film bearing allows such lateral movement of the table without generating contact forces at significant levels.

This apparatus and method have the advantage of enabling rapid, automated assembly of a hard disc onto a spindle while avoiding scraping contact therebetween sufficient to generate contaminating particles. This advantge is achieved without the use of sophisticated controls.

DETAILED DESCRIPTION

Figure 1:
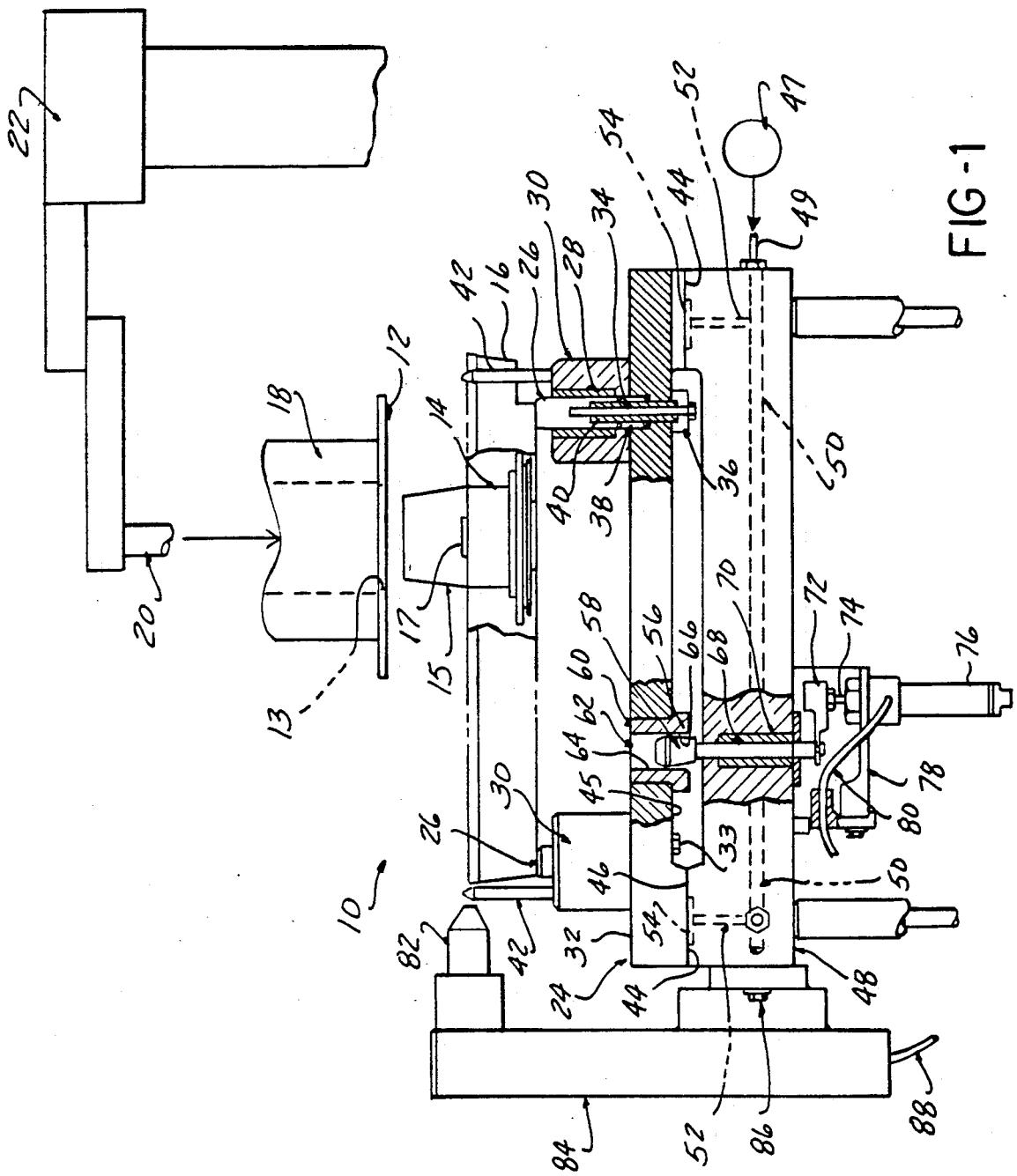
FIG. 1 is a front elevational view of the apparatus according to the present invention shown in partial section together with a diagrammatic representation of a robat arm associated therewith and the computer hard disc and spindle parts to be assembled.

FIG. 1 illustrate the apparatus 10 according to the present invention which is utilized to assemble a computer disc 12 onto the spindle 14 mounted in a housing piece 16. The computer disc 12 is illustrated being held by a pickup cylinder 18 attached to the Z axis member 20 of a robot arm device 22. Such devices are well known and commerically available such that a detailed description thereof is not here set out. Suffice it to say, the Z axis member 20 may be located anywhere in a horizontal plane within the working range of the device 22, and thereafter advanced along its vertical or Z axis direction.

Thus, a disc 12 may be picked up from a caddy stand (not shown) and moved in position over the spindle 14.

A homing fixture 15 is shown installed on the spindle 14, located on a boss portion 17 projecting axially from the end having a tapering diameter decreasing from a diameter the same as the maximum diameter of the spindle 14 to a diameter substantially less than that diameter. This is selected to be sufficiently less to insure that the opening 13 in the disc 12 can be passed over the small end of the homing fixture 15 by the robot arm 22 without contact within the tolerances of the parts and the positional accuracy capability of the robot arm 22. In a typical case, a taper down of .0.064 inches has been found sufficient.

The apparatus 10 includes a table 24 having a series of support pins 26 on which is placed the housing piece 16. Each support pin 26 is a compliant in the Z axis direction so as to accommodate slight interferences with the robot arm device 22 due to slight mispositionings or dimensional variations off the housing piece 16 or overshoots of the robot member 20. Each support pin 26 is slidably mounted in a bushing 28 disposed in a mounting cylinder 30. Each mounting cylinder 30 is held atop the upper surface 32 of the table 24 by a bolt 34, a long bolt 34 passes through a spacer block 36 and is threaded into the support pin 26. The support pin 26 can be deflected downwardly against the bias of a compression spring 38 encircling a spacer sleeve 40 and interposed between the support pin 26 and a counterbore in the table 24.

A series of locator rods 42 project veritcally upward from the table 24, and are positioned to engage the sides of the housing piece 16 and laterally locate the same atop the support pins 26. Each locator rod 42 is pressed into a mounting cylinder 30.

The table 24 is configured with a series of bearing pad surfaces 44 defined by a relieved area 45 formed in the underside of the table 24. The pad surfaces 44 are floated on a gas film established above a corresponding surface 46 of a support plate 48 positioned beneath the table 24. The gas film is established by supplying compressed air via line 49 connected to a source 47 to a network of flow passages 50 bored within support plate 48, feeding exit passages 52 directing air flow into a crossing pattern of grooves 54 let into each of the surfaces 46. The table 24 is thus supported on an air bearing to allow lateral movement thereof with almost zero frictional resistance.

Locator devices 56 are provided actuatable alternatively to positively lock the table 24 against lateral movement on the gas film bearing and locate the spindle 14 in the horizontal plane, and release the table 24 for lateral floating movement within limited excursion range. The locator devices 56 each comprise a tapered plug 58 positioned within a bushing 60 pressed into the table 24. The bushing 60 has a bore 62 machined therein having a small diameter upper section 64 and a larger diameter lower section 66. The plug 58 is tightly fit to the upper section 64 to establish a lock therebetween, when the plug 58 is elevated into the upper section 64.

The plug 58 is sized so that a substantial clearance exists with respect to the lower section 66 so that with the plug 58 lowered, a range of floating movement of the table 24 is allowed, but movement of the table 24 off the surfaces 46 is prevented by the plugs 58.

The plug 58 is formed with an integral stem 68 slidably received in a bushing 70 fit into the support plate 48 to laterally anchor the plug 58.

The stem 68 is attached to a coupling piece 72 attached to the operating rod 74 of an actuator 76 mounted by means of a bracket 78, and a bolt 79 beneath the support plate 48. The actuator 76 may comprise an air cylinder controllably pressurized by compressed air via line 80 to raise the plug 58.

The actuator may be double acting to withdraw the plug 58 from the first bore section 64 and position it within the second bore section 66, or may be spring urged to the release position.

An optical part sensor 82 is mounted on a bracket 84 attached to one side of the support plate 48 with bolts is provided, transmitting a signal via cable 88 to the machine controls indicating the presence or absence of a housing piece 16 at the start-up of the assembly operation.

Figure 2:
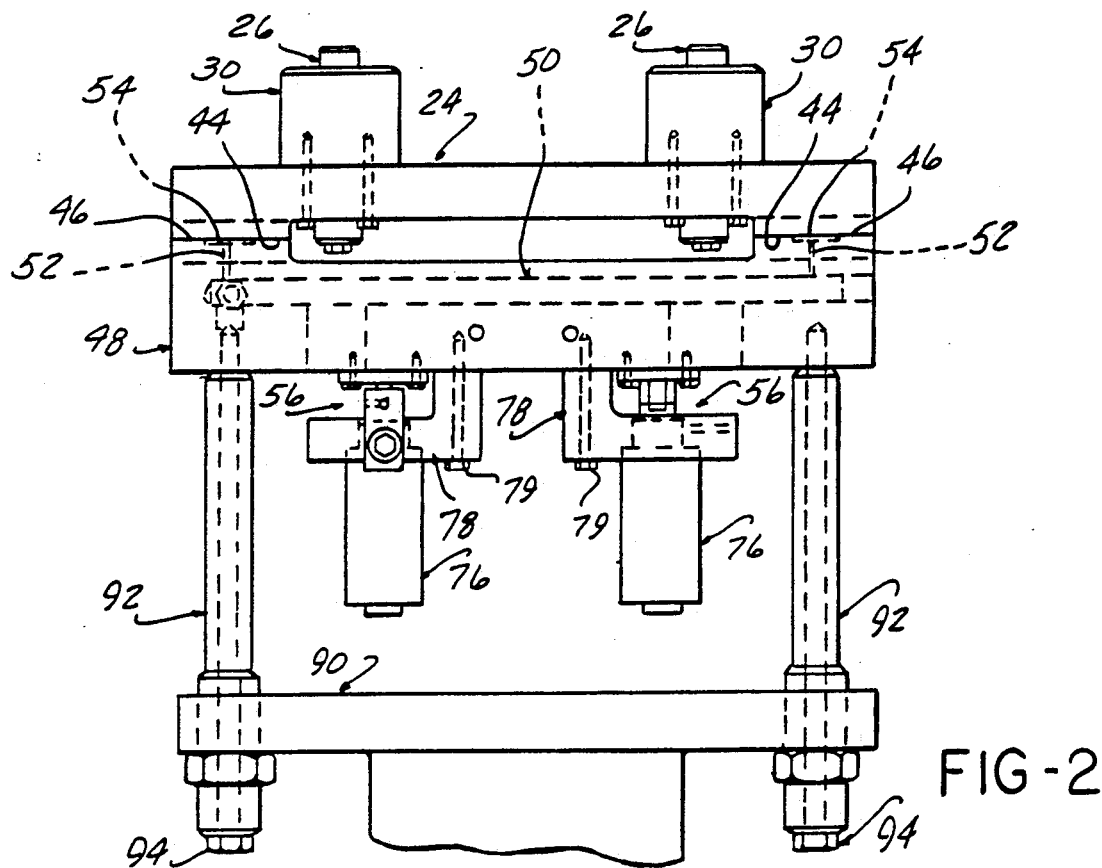
FIG. 2 is a side elevational view of the apparatus shown in FIG. 1 with the locator rods and part detector omitted, and showing fragmentary portions of a supporting frame.

FIG. 2 shows that the support plate 48 is in turn supported on a frame 90 by a series of pedestals 92 and bolts 94.

Figure 3:
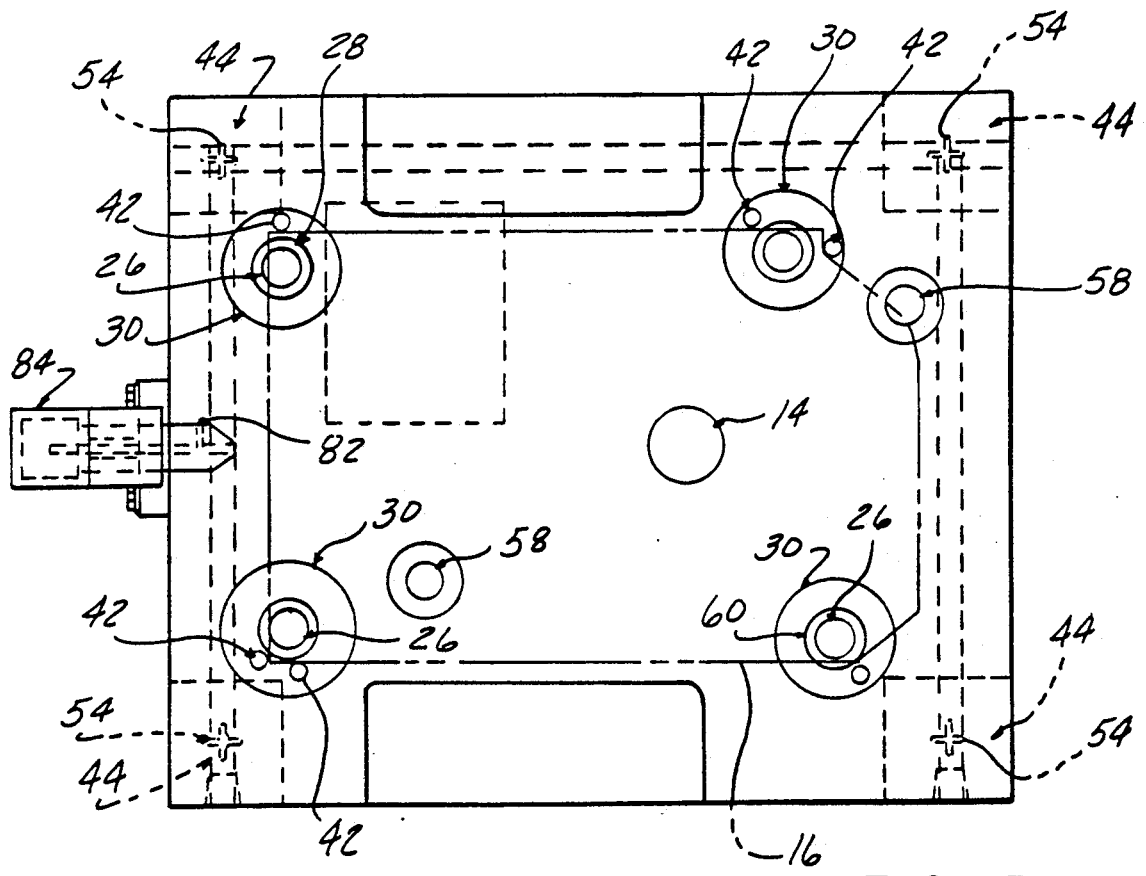
FIG. 3 is a plan view of the apparatus shown in FIG. 1.

FIG. 3 shows that a total of six locator rods 42 engage the periphery of the particular housing piece 16 shown and four support pins 26 are employed.

Two locating devices 56 are deployed, offset in the X and Y direction the insure accurate location of the spindle 14 in the X-Y plane.

A bearing pad 44 is located at each corner of the rectangular table 24 to support the table 54 on a gas film bearing by outflow of compressed air from the crossing groove pattern 54.

OPERATION

The table 24 is initially locked in a fixed position by actuation of the locator devices 56. The robot arm 22 initially deposits a housing piece 16 onto the support pins 26, laterally located on the table 24 by the locator rods 42 to fix the position of the spindle 14, and then places the homing fixture 14 atop the spindle 14. A disc 22 is picked up from a caddy (not shown) which is supported by apparatus configured similarly to that shown, and moved over the spindle 14 and homing fixture 15 and moved downwardly to receive the upper end of the fixture 15 within the opening 13 of the disc 12.

The actuator is then deactivated to remove the plug 58 from the bore upper section 64 and release the table 24 for floating lateral movement. The robot arm then lowers the disc 22 which moves laterally as necessary to enable it to be fit over the spindle 14. Since there is almost no frictional resistance to such lateral movement because of the presence of the gas film bearing, scraping forces are negligible to eliminate the generation of contaminating micro particles. A series of discs 22 (and spacers) may be assembled onto the spindle 14 and the homing fixture 15 thereafter removed.

We claim:

1. A method for robot assembly of computer hard discs (12) onto a spindle (14) in which a disc opening (13) is fit over the spindle (14) and the disc (12) is advanced axially onto the spindle (14), comprising the steps of:

positioning a homing fixture (15) on an upper end of said spindle (14) configured tapering up from the diameter of said spindle (14) to a diameter sufficiently smaller then that of said spindle to ensure fitting of the disc opening (13) thereover;

positively fixing the position of said spindle (14) at a fixed location in a horizontal plane;

advaning said disc (12) with a robot device (22), therby positioning said disc (12) with its opening (13) aligned over said homing fixture (15) and axially advancing said disc (12) with said robot device (22) over the samller diameter of said homing fixture (15);

releasing said spindle (14) from said fixed location thereby allowing lateral movement of said spindle on said plane while supporting said spindle (14) on a frictionless bearing (46, 54) allowing substantially friction free lateral movement thereof;

contemporaneously advancing said disc (12) onto said spindle (14) to be seated thereon, with lateral movements of said spindle (14) accommodating misalignments between said disc opening (13) and said spindle (14).

2. The method according to claim 1 including in said step of releasing said spindle (14) for lateral movement, positively restraining said spindle (14) from lateral movement beyond a limited range of excursion.

3. The method according to claim 2 including respectively moving a plug (58) axially between tightly fit and loosely fit bore sections (64, 66) in carrying out the steps of positively fixing and releasing said spindle (14).

* * * * *